Patented Aug. 29, 1944

2,356,929

UNITED STATES PATENT OFFICE 2,356,929

ANTI-FLEX-CRACKING AGENTS

Edwin J. Hart, Cedar Grove, N. J., assignor to United States Rubber Company, New York, N. Y., a corporation of New Jersey No Drawing. Application November 7, 1941, Serial No. 418,163

7 Claims. (Cl. 260—810)

This invention relates to improvements in anti-flex-cracking agents for rubber and rubber-like materials, and to the products containing said agents.

An object of the invention is to provide cheap available chemicals which have been found to possess the property of inhibiting fatigue failure or cracking due to repeated flexings of rubber, and with substantially no discoloration of the rubber when it is exposed to atmosphere and sunlight. Other objects will be apparent from the following description.

Broadly, the invention comprises incorporating in a rubber composition, a phenol in which the nuclear carbon atom 3, with respect to the hydroxy group, is attached to a methyl group, and the nuclear carbon atom 4 is attached to an alkyl group. The alkyl group may contain from 1 to 5 carbon atoms and may be a primary, a secondary or a tertiary alkyl radical. The compounds are 3-methyl-4-alkyl phenols. Examples of such compounds are:

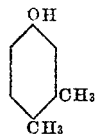

3,4-dimethyl phenol

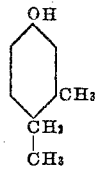

3-methyl-4-ethyl phenol

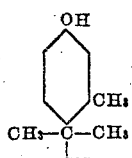

3-methyl 4-ter-butyl phenol

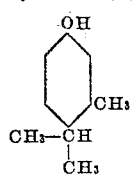

3-methyl 4-isopropyl phenol

Other positions on the ring in addition to the 3 and 4 positions may be substituted by alkyl groups such as illustrated by 3-methyl 4,6-di-ter-butyl phenol.

Most chemicals which inhibit fatigue failure or cracking of rubber due to repeated flexings either discolor a rubber compound containing them when exposed to the atmosphere and sunlight (diaryl amine type of chemical) or are comparatively expensive to produce (certain di-hydroxy-aromatics and derivatives). The most advantageous characteristic of the present invention is that the chemicals are cheap and readily available and do not discolor the rubber containing them on exposure to sunlight and the atmosphere.

The 3-methyl-4-alkyl phenols are more powerful anti-cracking agents than are simple mono-alkyl phenols or any other di-alkyl phenol in which the alkyl groups are attached to the benzene ring in positions other than on nuclear carbon atoms 3 and 4 with respect to the hydroxy group.

The data in the following table illustrate the property of these chemicals to inhibit fatigue failure due to repeated flexings of the rubber and are compared with the effect of di-alkyl phenols where the 3 and 4 positions are not substituted by alkyl groups. The chemical (1% based on the rubber) was added on a laboratory mill at approximately 180° F. to a typical tread compound (A) containing by weight:

| | Parts |
|---|---|
| Rubber | 100 |
| Carbon black | 45 |
| Softener | 7 |
| Zinc oxide | 2 |
| Accelerator | 1 |
| Sulfur | 2.5 |

Slabs one-tenth-inch thick were cured 35 min. at 146° C. in a mold, and samples cut from the cured slabs were flexed to failure.

| | | Tensile | Flexing to failure [1] |
|---|---|---|---|
| | | Lbs./sq. in. | Kc. |
| A | No chemical added (control) | 4,000 | 66 |
| B | 2,4-dimethyl phenol | 4,300 | 83 |
| C | 2,5-dimethyl phenol | 4,200 | 76 |
| D | 2,6-dimethyl phenol | 4,200 | 79 |
| E | 3,5-dimethyl phenol | 4,100 | 69 |
| F | 3,4-dimethyl phenol | 4,200 | 113 |
| G | 3-methyl,4-ter-butyl phenol | 4,400 | 138 |
| H | 3-methyl,4,6-di-ter-butyl phenol | 4,300 | 115 |

[1] Standard De Mattia flexing test: 300 cycles/min. through a "hairpin" bend to 100% elongation, at room temperature.

Comparison of the results on compound A (the control) with the results of compounds B, C, D and E, show that di-alkyl phenols, in general, do not significantly improve the flexing resistance of the stock, whereas the results on compounds F, G and H show a marked improvement in this respect. Correspondingly, greater improvements are obtained by using larger proportions of 3,4-di-methyl phenol, 3-methyl, 4-tertiary butyl phenol.

The anti-flex cracking agents may be used in amounts varying from 0.1% to 5% by weight based on the rubber or rubber-like material.

It is to be understood that while in the example of rubber mixes given above certain vulcanizing ingredients are disclosed, the invention is not limited thereto but may be carried out by the use of other suitable vulcanizing agents, fillers, accelerators, etc. The anti-flex cracking agent may be incorporated in the rubber on the mill, or incorporated therein by diffusion from solution containing the agent, or otherwise.

With the disclosure given above, it is obvious that modifications will suggest themselves, for example other rubbers than caoutchouc rubbers, namely, those rubbers which are artificially prepared to simulate the elastic properties of ordinary rubber, may likewise be treated according to the invention, and it is not desired to limit the invention otherwise than as set forth in the appended claims.

Having thus described my invention, what I claim and desire to protect by Letters Patent is:

1. A process of improving the flex-cracking properties of rubber compositions designed for repeated flexing during use, which comprises incorporating therein a 3-methyl-4-alkyl phenol in which the alkyl group contains from one to five carbon atoms and having the formula

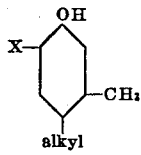

where X is a radical selected from the class consisting of hydrogen, and alkyl.

2. A process of improving the flex-cracking properties of rubber compositions designed for repeated flexing during use, which comprises incorporating therein 3,4-dimethyl phenol.

3. A process of improving the flex-cracking properties of rubber compositions designed for repeated flexing during use, which comprises incorporating therein 3-methyl-4-ter-butyl phenol.

4. A process of improving the flex-cracking properties of rubber compositions designed for repeated flexing during use, which comprises incorporating therein 3-methyl-4,6-di-ter-butyl phenol.

5. A vulcanized product of a rubber composition containing a 3-methyl-4-alkyl phenol in which the alkyl group contains from one to five carbon atoms, and having the formula

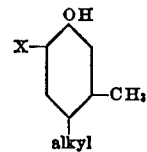

where X is a radical selected from the class consisting of hydrogen, and alkyl.

6. A vulcanized product of a rubber composition containing 3-methyl-4-ter-butyl phenol.

7. A process of improving the flex-cracking properties of rubber compositions designed for repeated flexing during use, which comprises incorporating therein a monohydroxy benzene which is additionally substituted only by alkyl groups including a methyl radical in the 3-position, and an alkyl radical containing from one to five carbon atoms in the 4-position, with respect to the hydroxy group.

EDWIN J. HART.